US006773683B2

(12) United States Patent
Elliott et al.

(10) Patent No.: US 6,773,683 B2
(45) Date of Patent: Aug. 10, 2004

(54) PHOTOCATALYTIC REACTOR SYSTEM FOR TREATING FLUE EFFLUENTS (75) Inventors: David J. Elliott, Wayland, MA (US); Allan R. Thompson, Woburn, MA (US); George D. Whitten, Stuart, FL (US); Jonathan C. Camp, Newburyport, MA (US); Mark T. Krajewski, Newton, MA (US)

(73) Assignee: UVTech Systems, Inc., Wayland, MA (US)

( * ) Notice: Subject to any disclaimer, the term of this patent is extended or adjusted under 35 U.S.C. 154(b) by 221 days.

(21) Appl. No.: 10/041,519

(22) Filed: Jan. 8, 2002

(65) Prior Publication Data

US 2002/0114745 A1 Aug. 22, 2002

Related U.S. Application Data (60) Provisional application No. 60/260,355, filed on Jan. 8, 2001.

(51) Int. Cl.$^7$ .......................... B01J 19/08; B01J 19/12
(52) U.S. Cl. ................................. 422/186.3; 422/186
(58) Field of Search .......................... 422/186, 186.3

(56) References Cited

U.S. PATENT DOCUMENTS

| | | | |
|---|---|---|---|
| 4,059,461 A | 11/1977 | Fan et al. ...................... 148/1.5 |
| 4,264,330 A | 4/1981 | Schmidt et al. ............... 436/56 |
| 4,296,146 A | 10/1981 | Penn ........................... 427/58 |
| 4,309,225 A | 1/1982 | Fan et al. ...................... 148/1.5 |
| 4,323,417 A | 4/1982 | Lam ............................ 156/613 |
| 4,381,965 A | 5/1983 | Maher, Jr. et al. ............ 156/345 |
| 4,400,715 A | 8/1983 | Barbee et al. ................. 357/49 |
| 4,439,245 A | 3/1984 | Wu .............................. 148/1.5 |
| D275,032 S | 8/1984 | Maher, Jr. et al. ........... D24/1.1 |
| 4,473,435 A | 9/1984 | Zafiropoulo et al. ......... 156/643 |
| 4,539,062 A | 9/1985 | Zajac .......................... 156/345 |
| 4,549,064 A | 10/1985 | Delfino ........................ 219/121 |
| 4,589,951 A | 5/1986 | Kawamura ................... 156/617 |
| 4,639,277 A | 1/1987 | Hawkins ..................... 148/33.3 |
| 4,655,849 A | 4/1987 | Schachameyer et al. ..... 148/1.5 |
| 4,659,401 A | 4/1987 | Reif et al. ................... 148/175 |
| 4,679,308 A | 7/1987 | Finn et al. .................... 29/576 |
| 4,685,976 A | 8/1987 | Schachameyer et al. .... 437/173 |
| 4,721,282 A | 1/1988 | Shawver et al. .............. 251/62 |
| 4,724,219 A | 2/1988 | Ridinger ...................... 437/19 |
| 4,737,233 A | 4/1988 | Kagmar et al. ......... 156/620.73 |
| 4,861,732 A | 8/1989 | Fujimura et al. ........... 437/229 |
| 4,889,588 A | 12/1989 | Fior ........................... 156/643 |
| 4,938,839 A | 7/1990 | Fujimura et al. ........... 156/628 |
| 4,949,670 A | 8/1990 | Krogh ........................ 118/723 |
| 4,976,996 A | 12/1990 | Monkowski et al. ..... 427/255.5 |
| 5,002,631 A | 3/1991 | Giapis et al. .................. 216/60 |
| 5,091,339 A | 2/1992 | Carey ......................... 437/187 |
| 5,171,415 A | 12/1992 | Miller et al. ........... 204/298.09 |
| 5,174,826 A | 12/1992 | Mannava et al. ........... 118/719 |
| 5,188,717 A | 2/1993 | Broadbent et al. ..... 204/192.12 |
| 5,219,786 A | 6/1993 | Noguchi ..................... 437/174 |
| 5,228,206 A | 7/1993 | Grant et al. .................... 34/1 |
| 5,234,526 A | 8/1993 | Chen et al. ................. 156/345 |
| 5,234,540 A | 8/1993 | Grant et al. ................. 156/646 |
| 5,238,499 A | 8/1993 | van de Ven et al. ........ 118/724 |
| 5,264,383 A | 11/1993 | Young .......................... 437/40 |
| 5,298,112 A | 3/1994 | Hayasaka et al. ........... 156/643 |

(List continued on next page.)

OTHER PUBLICATIONS

Elliott et al., "Deep UV–Photoreactive Cleaning with Catadioptrie Projection Optics and Reactive Gases", Future Fan International, pp. 273–276, 279–282.

*Primary Examiner*—Steven Versteeg
(74) *Attorney, Agent, or Firm*—Iandiorio & Teska (57) ABSTRACT A photocatalytic reactor system consisting of a photonic energy source to remove undesirable contaminants from an effluent stream. The device includes a photonic energy source, a beam delivery system, and a reaction chamber into which the photonic energy is transmitted. The contaminated effluent flows through the reaction chamber where the photonic energy reacts with it to reduce contaminant emissions.

51 Claims, 7 Drawing Sheets

U.S. PATENT DOCUMENTS

| | | | |
|---|---|---|---|
| 5,346,586 A | 9/1994 | Keller | 156/656 |
| 5,346,850 A | 9/1994 | Kaschmitter et al. | 437/81 |
| 5,391,517 A | 2/1995 | Gelatos et al. | 437/190 |
| 5,393,374 A | 2/1995 | Sato et al. | 156/643 |
| 5,393,482 A | 2/1995 | Benda et al. | 419/1 |
| 5,403,436 A | 4/1995 | Fujimura et al. | 156/643 |
| 5,458,724 A | 10/1995 | Syverson et al. | 156/345 |
| 5,488,229 A | 1/1996 | Elliott et al. | 250/492.2 |
| 5,516,492 A * | 5/1996 | Dong et al. | 422/186 |
| 5,529,951 A | 6/1996 | Noguchi et al. | 437/174 |
| 5,534,107 A | 7/1996 | Gray et al. | 156/643.1 |
| 5,534,231 A | 7/1996 | Savas | 216/67 |
| 5,559,338 A | 9/1996 | Elliott et al. | 250/492.1 |
| 5,580,421 A | 12/1996 | Hiatt et al. | 150/643.1 |
| 5,605,599 A | 2/1997 | Benzing et al. | 156/643.1 |
| 5,614,026 A | 3/1997 | Williams | 118/723 |
| 5,618,752 A | 4/1997 | Gaul | 438/626 |
| 5,647,953 A | 7/1997 | Williams et al. | 156/643.1 |
| 5,655,312 A | 8/1997 | Sevcik | 34/275 |
| 5,662,143 A | 9/1997 | Caughran | 137/884 |
| 5,669,979 A | 9/1997 | Elliott et al. | 134/1 |
| 5,679,215 A | 10/1997 | Barnes et al. | 156/646.1 |
| 5,722,877 A | 3/1998 | Meyer et al. | 451/41 |
| 5,762,755 A | 6/1998 | McNeilly et al. | 156/652.1 |
| 5,791,268 A | 8/1998 | Battles et al. | 110/345 |
| 5,814,154 A | 9/1998 | Boitnott | 118/723 |
| 5,814,156 A | 9/1998 | Elliott et al. | 134/1 |
| 5,824,604 A | 10/1998 | Bar-Gadda | 438/725 |
| 5,830,277 A | 11/1998 | Johnsgard et al. | 118/725 |
| 5,841,623 A | 11/1998 | Denison et al. | 361/234 |
| 5,846,443 A | 12/1998 | Abraham | 216/77 |
| 5,855,675 A | 1/1999 | Doering et al. | 118/719 |
| 5,863,170 A | 1/1999 | Boitnott et al. | 414/222 |
| 5,863,376 A | 1/1999 | Wicker et al. | 156/345 |
| 5,882,414 A | 3/1999 | Fong et al. | 118/723 R |
| 5,891,513 A | 4/1999 | Dubin et al. | 427/98 |
| 5,895,272 A | 4/1999 | Li | 438/705 |
| 5,913,147 A | 6/1999 | Dubin et al. | 438/687 |
| 5,914,278 A | 6/1999 | Boitnott et al. | 438/724 |
| 5,922,219 A | 7/1999 | Fayfield et al. | 216/58 |
| 5,928,426 A | 7/1999 | Aitchison | 118/715 |
| 5,930,669 A | 7/1999 | Uzoh | 438/627 |
| 5,935,538 A * | 8/1999 | Tabatabaie-Raissi et al. | 423/215.5 |
| 5,948,283 A | 9/1999 | Grosshart | 216/67 |
| 5,964,949 A | 10/1999 | Savas | 118/723 |
| 5,968,279 A | 10/1999 | MacLeish et al. | 134/1.2 |
| 5,969,422 A | 10/1999 | Ting et al. | 257/762 |
| 5,983,828 A | 11/1999 | Savas | 118/723 |
| 5,984,391 A | 11/1999 | Vanderpot et al. | 294/1.1 |
| 5,985,089 A | 11/1999 | Leibovich et al. | 156/345 |
| 5,988,187 A | 11/1999 | Trussell et al. | 134/22.1 |
| 5,989,623 A | 11/1999 | Chen et al. | 427/97 |
| 5,990,008 A | 11/1999 | Koyama et al. | 438/687 |
| 5,996,528 A | 12/1999 | Berrian et al. | 118/723 |
| 5,997,823 A | 12/1999 | Haslbeck | 422/169 |
| 6,006,694 A | 12/1999 | DeOrnellas et al. | 118/723 |
| 6,008,117 A | 12/1999 | Hong et al. | 438/629 |
| 6,013,155 A | 1/2000 | McMillin et al. | 156/345 |
| 6,015,503 A | 1/2000 | Butterbaugh et al. | 216/66 |
| 6,022,416 A | 2/2000 | Olson | 118/726 |
| 6,024,887 A | 2/2000 | Kuo et al. | 216/48 |
| 6,027,603 A | 2/2000 | Holland et al. | 156/345 |
| 6,035,868 A | 3/2000 | Kennedy et al. | 134/1.1 |
| 6,037,258 A | 3/2000 | Liu et al. | 438/687 |
| 6,038,358 A | 3/2000 | Nishiki | 385/37 |
| 6,042,687 A | 3/2000 | Singh et al. | 156/345 |
| 6,042,901 A | 3/2000 | Denison et al. | 427/579 |
| 6,048,435 A | 4/2000 | DeOrnellas et al. | 156/345 |
| 6,052,176 A | 4/2000 | Ni et al. | 356/72 |
| 6,054,206 A | 4/2000 | Mountsier | 428/312.8 |
| 6,063,348 A | 5/2000 | Hinke et al. | 423/235 |
| 6,090,458 A | 7/2000 | Murakami | 427/586 |
| 6,103,624 A | 8/2000 | Nogami et al. | 438/687 |
| 6,136,096 A | 10/2000 | Morishige | 118/720 |
| 6,190,458 B1 | 2/2001 | Harada | 118/715 |
| 6,303,083 B1 | 10/2001 | Johnson et al. | 422/171 |
| 6,374,770 B1 | 4/2002 | Lee et al. | 118/723 E |

* cited by examiner

PHOTOCATALYTIC REACTOR SYSTEM FOR TREATING FLUE EFFLUENTS

RELATED APPLICATIONS

This application claims the benefit of U.S. Provisional Patent Application Serial No. 60/260,355, entitled AN ULTRAVIOLET LASER CATALYZED REACTOR SYSTEM FOR THE RAPID REDUCTION OF SULFUR DIOXIDE IN FLUE GAS EFFLUENTS filed on Jan. 8, 2001.

FIELD OF THE INVENTION

This invention relates to a photocatalytic reactor system for the reduction of contaminants, typically sulfur dioxide, in flue effluents which may reduce or eliminate acid rain caused by the emission of sulfur dioxide produced by high sulfur fuels. This invention will permit the use of high sulfur coals such as certain bituminous coals, which are more abundant, higher in energy content, and lower in cost. In addition, the photocatalytic reactor system of this invention is simpler in construction and therefore lower in cost, both in cost of production and operation, than conventional methods. Additionally, the photocatalytic reactor of this invention can produce a useful and salable by-product.

BACKGROUND OF THE INVENTION

Fossil fuel combustion, such as used in power generation plants, results in effluent streams containing numerous contaminants, including sulfur dioxide. In the upper atmosphere, sulfur dioxide converts to sulfur trioxide which readily combines with water to form sulfuric acid, a major component of acid rain.

Conventional methods for removing contaminants from flue effluents are very large, complex, and expensive systems to purchase and operate, and produce wastes with high disposition costs. There are five problems associated with such known systems and methods.

The first problem is that conventional reactors cannot effectively remove sulfur dioxide from the effluent that comes from burning high sulfur content coal.

The second problem is the complexity and high operational expenses of current sulfur dioxide reduction methods, which commonly require the use of expensive catalysts, e.g. vanadium pentoxide.

The third problem is the requirement to use lower sulfur content coal in order for conventional effluent treatments to effectively meet current environmental regulations. Current EPA regulations for commercial and industrial sources specify that "Any coal, oil, or mixture thereof, burned in any fuel burning or process installation not covered by New Source Performance Standards for sulfur emissions shall contain no more than 1.0 pound sulfur per million gross BTU heat input for any mixture of coal" (R307-203-1). Using as an example Northern Appalachian region coals— less than 5% of raw coal samples burned would comply with this standard. The raw coal would need to be pre or post-combustion treated. For Midwest region coals, less than 1% of raw coal samples burned will comply with the EPA regulations.

Figure 1:
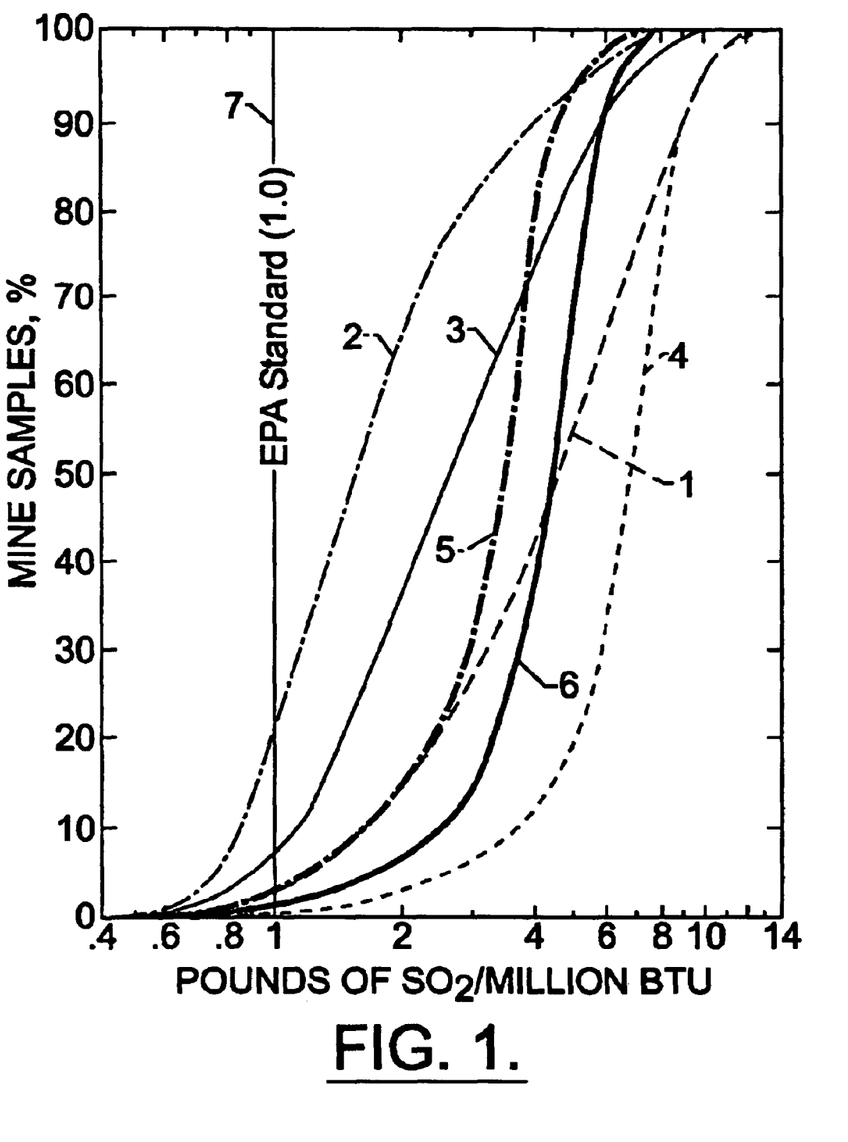
FIG. 1 is a graph of sulfur emissions for Midwest and northern Appalachian coal.

The fourth problem lies in the use of higher sulfur content coal, as it must be pre-cleaned in such a way as to reduce its sulfur content. Of the mineral impurities found in coal, sulfur is the most important single element impeding the utilization of coal as a clean fuel. For example, the coal fields of Illinois, Indiana and western Kentucky contain 29% of the estimated remaining bituminous coal reserves of the United States. However the coals from these states tend to have high organic sulfur content. Approximately 80% of the reserve has a sulfur content of greater than 3%. As shown in FIG. 1, the current EPA standard is represented by line 7. Lines 1, 2 and 3 show the pounds of sulfur dioxide emitted per million Btu for northern Appalachian coal fired raw (1), crushed to 14-mesh top size (2) and crushed to 1½" top size (3). Similarly, lines 4, 5 and 6 show the data for Midwestern coal fired raw (4), crushed to 14-mesh top size (5) and crushed to 1½" top size (6). See Eliot, Robert C., *Coal Desulphurization Prior to Combustion*, Noyes Pub., December, 1978. The technology exists today to clean high sulfur content coals prior to combustion, but depending on the level of preparation required, this can add significant cost to the coal delivered.

The fifth problem is that a substantial amount of an electric power plant's output is needed to run conventional catalytic reactors thereby decreasing the overall efficiency of the plant.

These known systems all convert sulfur dioxide to sulfur trioxide as it is easier to separate sulfur trioxide from the effluent stream. Numerous conventional techniques exist to remove sulfur trioxide from the effluent stream, including limestone gypsum wet scrubbing, sea water washing, ammonia scrubbing, spray-dry process, and sodium bicarbonate injection process. These techniques are described in U.S. Pat. Nos. 5,791,268; 5,997,823; 6,063,348; and 6,303,083.

BRIEF SUMMARY OF THE INVENTION

It is therefore an object of this invention to provide a photocatalytic reactor system that can effectively remove sulfur dioxide from the smoke that comes from burning high sulfur content coal.

It is a further object of this invention to provide a less complex and more cost effective reactor than the current technology and to provide such a reactor that is simpler in design and therefore more reliable to operate and has lower operational costs.

It is a further object of this invention to enable the use of types of coal that were formerly unusable due to their high sulfur content and thereby increase non-petroleum energy reserves.

It is a further object of this invention to enable the use of types of coal that were formerly too expensive to use due to the cost of pre-combustion cleaning and thereby increase non-petroleum energy reserves.

It is a further object of this invention to provide a reactor that takes less of a power plant's energy to operate and increase the saleable output of the power plant and therefore decrease the cost of electricity to consumers.

It is a further object of this invention to provide such a photocatalytic reactor system which is readily integrated into existing effluent streams.

The invention results from the realization that sulfur dioxide converts to sulfur trioxide as a spontaneous reaction in the upper levels of the atmosphere in the presence of solar radiation and that, by adding photonic radiation to the effluent stream, this reaction can be made to occur efficiently and rapidly before the effluent stream is released into the atmosphere. Photonic energy can produce a variety of reactions necessary and useful in treating and reacting flue gas or other effluents. Such photonic energy can be easily introduced into the effluent stream with sufficient intensity to produce a useful reaction; that the reactor vessel can be a simple design with few or no moving parts to make it highly competitive with existing technology; that the photonic energy can be combined with reactive or inert reactants, and their chemical counterparts, to produce a variety of reactions necessary and useful in treating contaminants in flue effluent or other reactants; that the reaction efficiency is higher than is currently available from conventional effluent treatment technologies; that the reaction chambers can be provided in different sizes and geometries to produce specific reactions; and that the reaction chambers may be configured in parallel or series or a combination of the two in order to react with a greater quantity or flow of effluent.

This invention features a photocatalytic reactor system for treating flue effluents containing at least one contaminant including at least one reactor vessel, an effluent inlet connected to the reactor vessel for receiving an effluent stream, at least one photonic energy source coupled to the reactor vessel for introducing photonic energy into the effluent stream, and an effluent outlet connected to the reactor vessel for discharging a treated effluent stream. The photonic energy catalyses a reaction in the effluent stream to reduce contaminant emissions.

In a preferred embodiment, photonic energy source may be a laser or a lamp. The photonic energy source may include an ultraviolet (UV) energy source.

The photocatalytic reactor system may include a plurality of reactor vessels connected in parallel, series, or in a matrix of parallel and series configurations to react with a greater flow of the effluent stream. The reactor vessel may be cylindrical, spherical, quadrangular or any other suitable shape.

The contaminant in the effluent stream may be sulfur dioxide, and the sulfur dioxide may be converted to sulfur trioxide by the photonic energy.

A reactant inlet may be connected to the reactor vessel for injecting at least one reactant into the reaction vessel. The reactant may be an inert gas or inert chemical or chemical mixture. The reactant may be a reactive gas or a reactive chemical or chemical mixture. The reactant may, for example, accelerate the conversion of sulfur dioxide to sulfur trioxide.

The photocatalytic reactor system may also include a plurality of photonic energy sources connected to the reactor vessel for increasing the amount of photonic energy introduced into the effluent stream.

This invention also features an ultraviolet catalytic reactor system for treating an effluent stream containing at least one contaminant including at least one reactor vessel, an effluent inlet connected to the reactor vessel for receiving the effluent stream, at least one ultraviolet energy source coupled to the reactor vessel for introducing ultraviolet energy into the effluent stream, and an effluent outlet connected to the reactor vessel for discharging a treated effluent stream. The ultraviolet energy catalyzes a reaction in the effluent stream to reduce contaminant emissions.

In a preferred embodiment, the ultraviolet energy source may be a laser or a lamp. There may be a plurality of reactor vessels connected in parallel, series or a combination of parallel and series configurations to react with a greater flow of the effluent stream. The reactor vessel may be cylindrical, spherical, quadrangular or any other suitable shape.

The contaminant in the effluent stream may be sulfur dioxide, and the sulfur dioxide may be converted to sulfur trioxide by the ultraviolet energy. The ultraviolet catalytic reactor system may also include a reactant inlet connected to the reactor vessel for injecting a reactant into the reaction vessel. The reactant may be an inert gas, an inert chemical or chemical mixture, a reactive gas, or a reactive chemical or chemical mixture. The reactant may accelerate the conversion of sulfur dioxide to sulfur trioxide.

The photocatalytic reactor system may also include a plurality of photonic energy sources connected to the reactor vessel for increasing the amount of photonic energy introduced into the effluent stream.

This invention also features an ultraviolet catalytic reactor system for treating an effluent stream containing at least one contaminant including at least one reaction chamber including an annular ring including a first opening for receiving an effluent stream and a second opening for discharging a treated effluent stream, a plurality of ultraviolet energy inlets in the annular ring for introducing ultraviolet energy into the effluent stream, and at least one ultraviolet energy source connected to the plurality of ultraviolet energy inlets. The ultraviolet energy catalyzes a reaction in the effluent stream to reduce contaminant emissions.

In a preferred embodiment, the ultraviolet energy source may be connected to the plurality of ultraviolet energy inlets by a plurality of optical fibers. The ultraviolet energy source may be a laser or a lamp. The annular ring may include a plurality of injection nozzles for injecting a reactant into the reaction chamber. The plurality of injection nozzles may be connected to a manifold for delivery of the reactant. The reactant may be an inert gas, an inert chemical or chemical mixture, a reactive gas, or a reactive chemical or chemical mixture.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
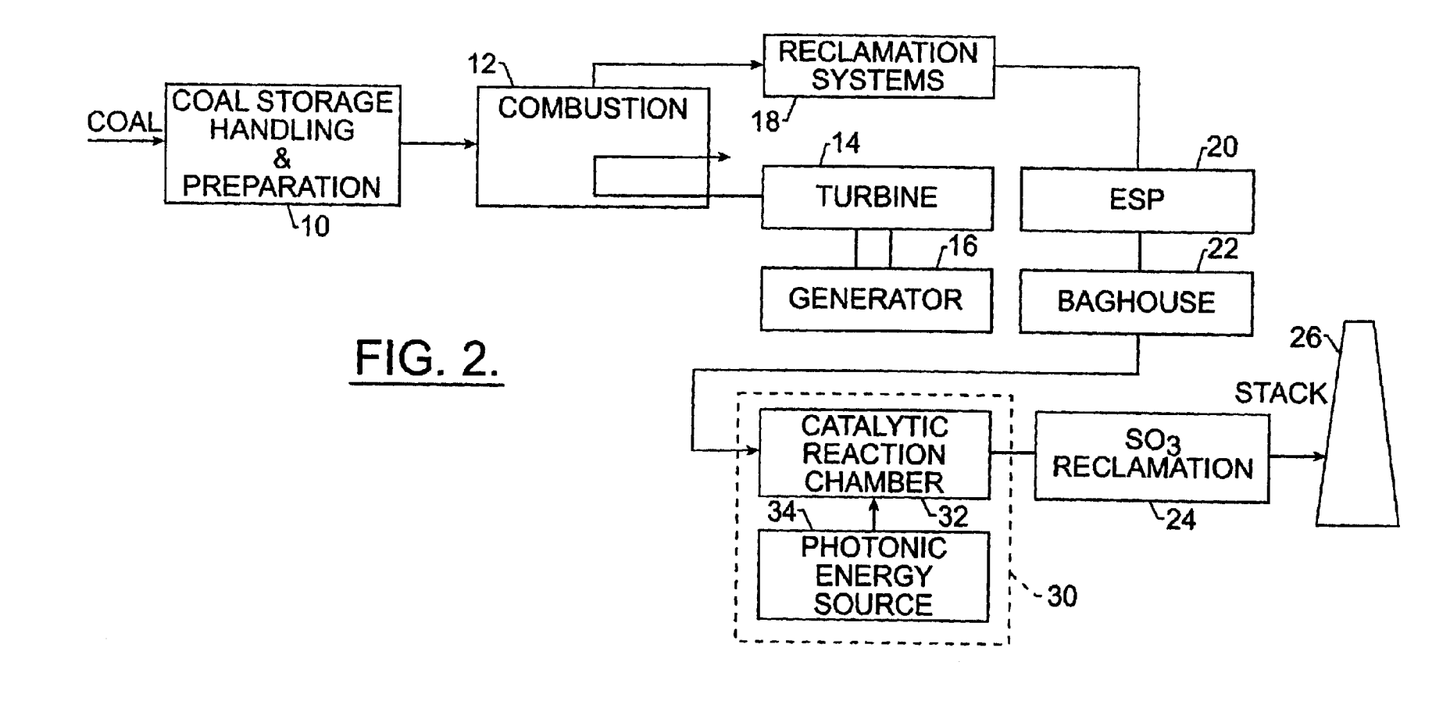
FIG. 2 is a simplified block diagram of a typical coal fired power generation plant including a photocatalytic reactor according to the present invention.

FIG. 2 is a block diagram showing a simplified configuration of a typical coal fired power generation plant. Coal to be burned in received at the coal storage and preparation station 10. The coal is burned in furnace 12. Steam heated by the combustion process is fed to turbine 14 which runs generator 16 to produce electricity. The effluent stream from the combustion process is fed into reclamation systems 18, electrostatic precipitator 20, baghouse 22 and photocatalytic reactor 30 before being released into the atmosphere through stack 26.

Photocatalytic reactor 30 includes reaction chamber 32 and photonic energy source 34 which directs photonic energy into reaction chamber 32. Photocatalytic reactor 30 is inserted into the effluent flow path after conventional electrostatic precipitators 20 and bag houses 22 or other filter types. The effluent flows through reaction chamber 32 where it is exposed to photonic energy from the photonic source 32. After being processed in photocatalytic reactor 30, the treated effluent exits reaction chamber 32 and goes towards stack 26. Reclamation system 24 is used to remove the sulfur trioxide from the treated effluent prior to release to the atmosphere through stack 26.

Figure 3:
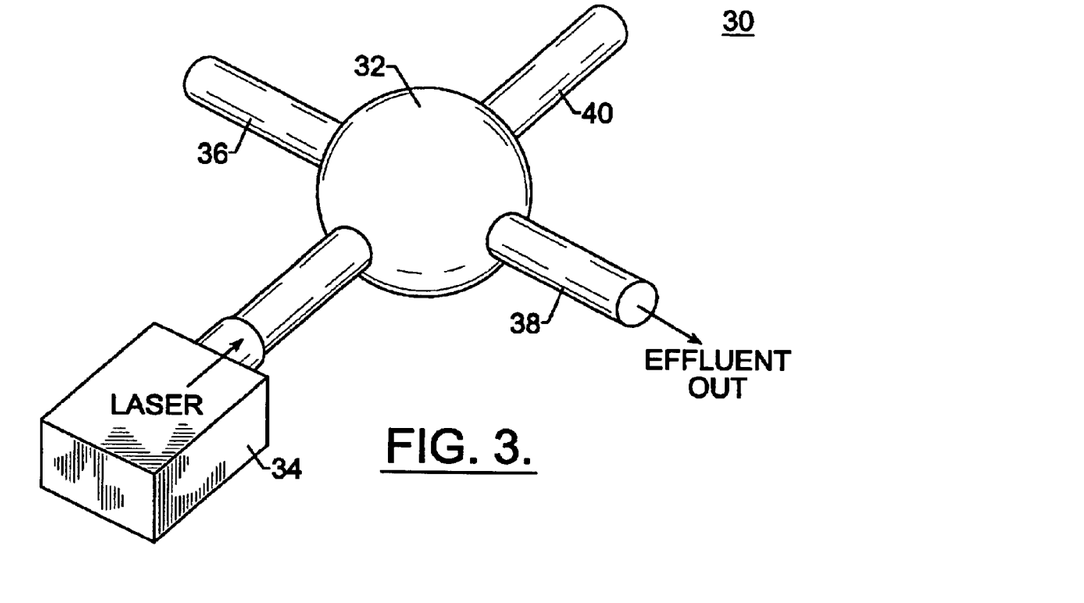
FIG. 3 is a three dimensional schematic view of a photocatalytic reactor according to the present invention.

Photocatalytic reactor 30, FIG. 3, includes effluent inlet 36, effluent outlet 38. Optionally, reactant inlet 40 may also be provided to allow for the introduction of a reactant to ensure more complete and efficient conversion of the contaminants in the effluent stream. The reactant may be a reactive or inert gas, or any chemical or chemical mixture which may provide the reactant to the effluent stream inside the reactor. The reactant may accelerate the conversion of sulfur dioxide to sulfur trioxide. Typically, there is about 8% oxygen in an effluent stream which is sufficient to effectively convert all of the sulfur dioxide to sulfur trioxide. However, more faster and efficient conversion may occur with the addition of more oxygen into the reaction chamber through reactant inlet 40.

In operation, the high sulfur coal effluent enters the reaction chamber 32 where it interacts with the photonic energy. The photonic energy reacts with the gaseous sulfur dioxide contained in the effluent and oxygen which is either entrained in the effluent stream or injected through reactant inlet 40 and changes it to sulfur trioxide. The sulfur trioxide is recovered in the post reaction collection system and may be reused, disposed of or converted to a salable product.

The reaction chamber may be of any suitable shape such as cylindrical (32a, 32a', 32a" in FIG. 4), spherical (32b, 32b', 32b" in FIG. 5), quadrangular or any other regular or irregular shape.

Figure 4:
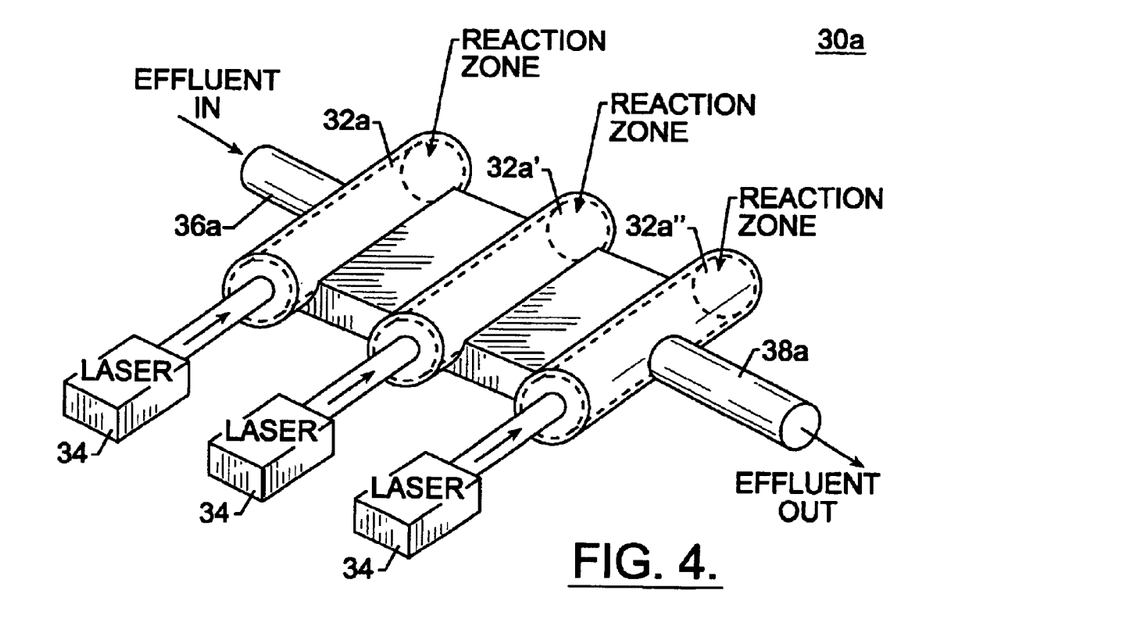
FIG. 4 is a three-dimensional schematic view of a 3-stage photocatalytic reactor of cylindrical shape connected in series according to the present invention.
Figure 5:
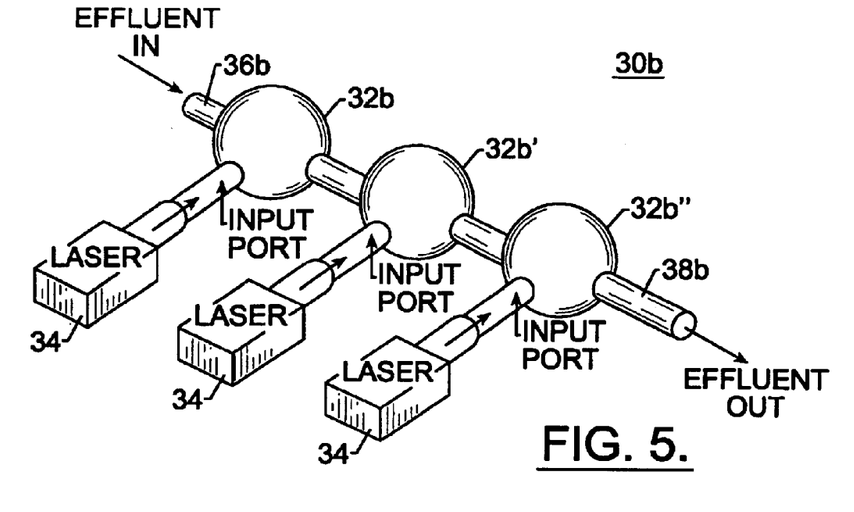
FIG. 5 is a three-dimensional schematic view of a 3-stage photocatalytic reactor of spherical shape connected in series according to the present invention.
Figure 6:
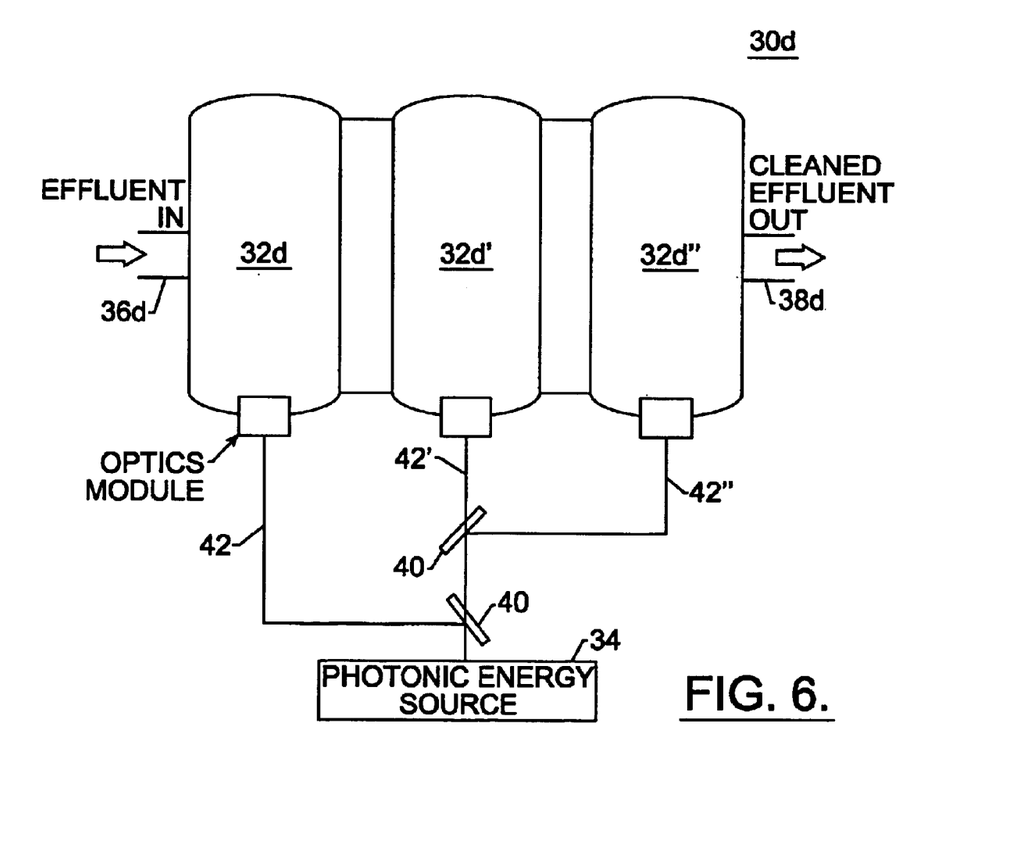
FIG. 6 is a top plan view of a 3-stage photocatalytic reactor of cylindrical shape with one photonic energy source split and directed into the 3 separate stages according to the present invention.

As shown in FIGS. 4–8, a plurality of the photocatalytic reactors may be combined in various configurations. 30a, 30b, 30d, 30e and 30f, to allow for the treatment of higher flows of effluents or effluent streams with higher concentrations of contaminants. Each such reaction chamber is then considered to be a "stage" in the overall reaction process. In FIGS. 4, 5 and 6, the photocatalytic reactors are in series. The effluent enters the effluent inlet port (e.g., 36a in FIG. 4, 36b in FIG. 5 and 36d in FIG. 6) and enters first reactor 32a. The photonic energy enters reactor 32a at a normal angle to the effluent flow. This process is then repeated in the next stage or reaction chamber, e.g., 32a' in FIG. 4, for as many stages are required to effectively clean the effluent. The cleaned effluent then exits the reaction chamber through effluent outlets 38a, 38b and 38d.

Figure 7:
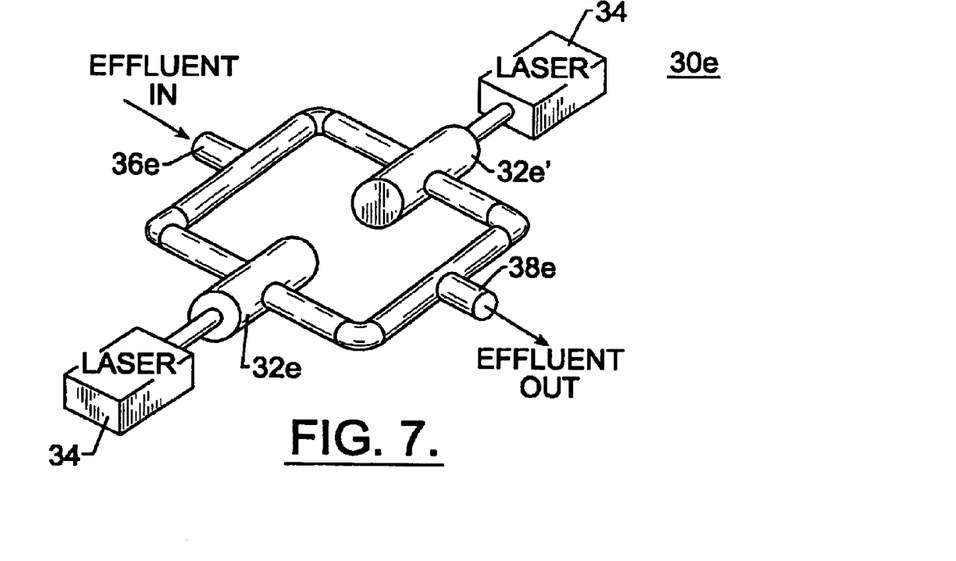
FIG. 7 is a three-dimensional schematic view of two cylindrical photocatalytic reactors connected in parallel according to the present invention.

Reactor system 30e, FIG. 7, shows two cylindrical reaction chambers 32e, 32e' connected in parallel to effluent inlet 36e and effluent outlet 38e. Photonic energy sources 34e, 34e' provide photonic energy to chambers 32e, 32e', respectively.

Figure 8:
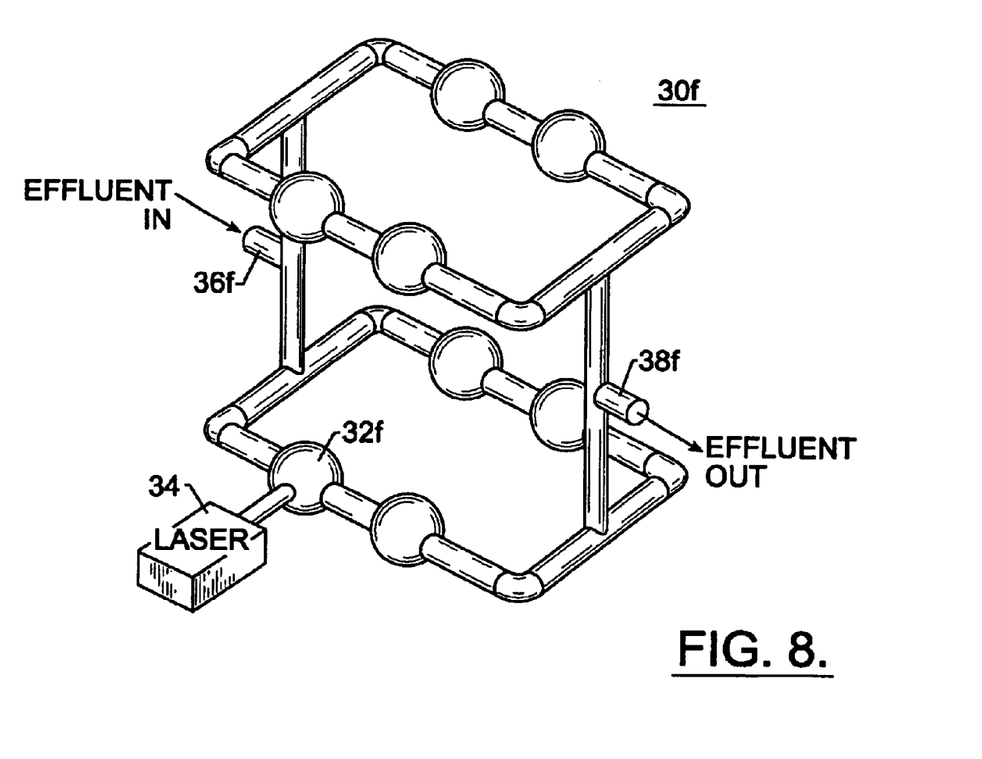
FIG. 8 is a three-dimensional schematic view of a matrix of photocatalytic reactors connected in both series and parallel according to the present invention.

Reactor system 30f, FIG. 8, shows a matrix of eight total reactor chambers, one of which is identified as 32f, connected to effluent inlet 36f and effluent outlet 38f. The matrix shown in FIG. 8 consists of four pairs of two reactor chambers connected in series with the four pairs connected in parallel. Those skilled in the art can easily imagine any number of various configurations of reaction chambers.

While the previously discussed examples show a separate photonic energy source for each reaction chamber, it is also possible to use one photonic energy source 34d, FIG. 6, for multiple reaction chambers. The photonic energy is split using mirrors 40 such that a first portion of the photonic energy 42 is directed into chamber 32d, a second portion of the photonic energy 42' is directed into chamber 32d', and a third portion of the photonic energy 42" is directed into chamber 32d". By selecting the characteristics of mirrors 40 appropriately, the amount of the total photonic energy directed into each of chambers 32d, 32d', and 32d" may be adjusted.

Figure 9:
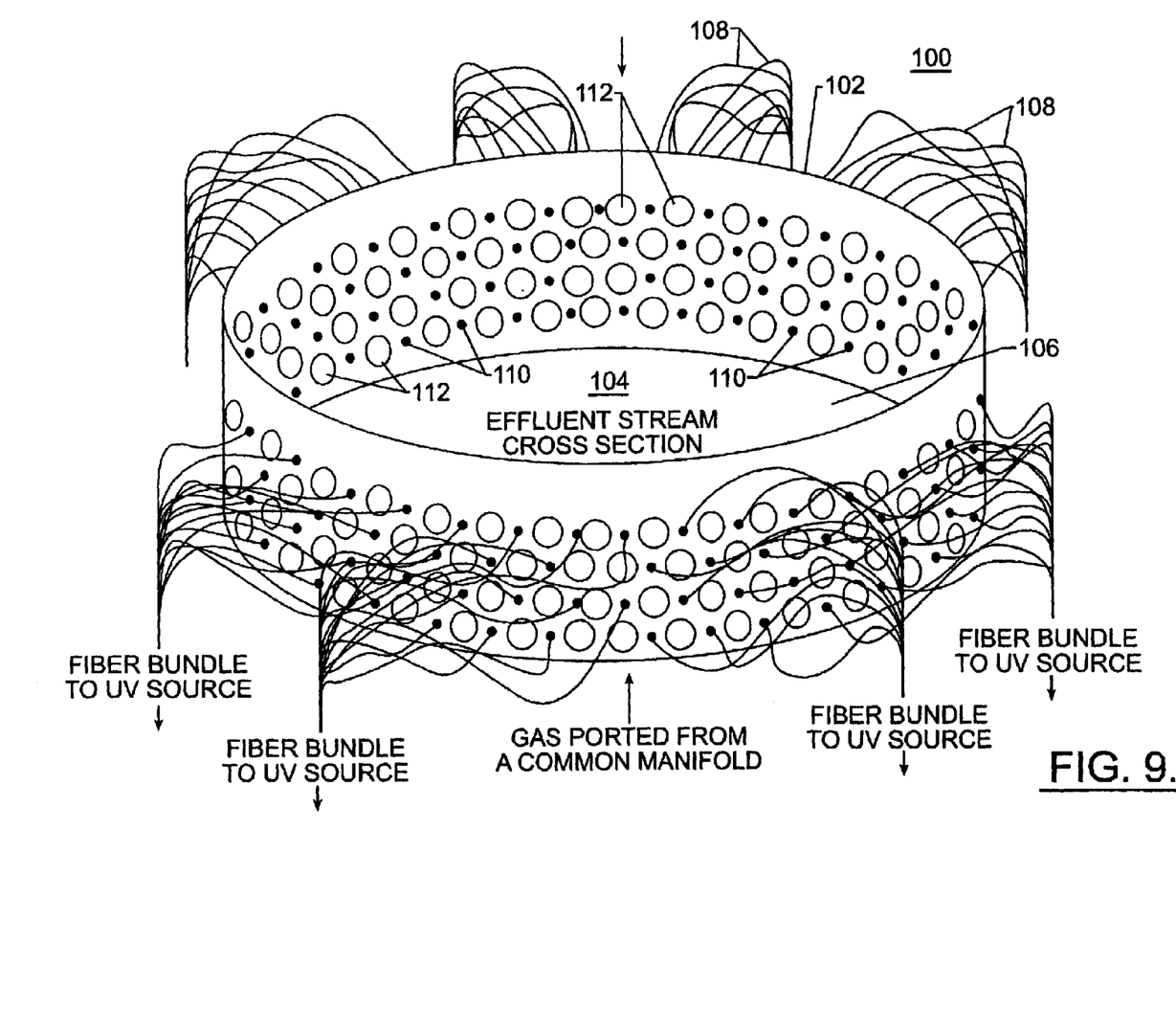
FIG. 9 is a three-dimensional schematic view of an annular ring photocatalytic reactor according to the present invention.

Photonic reactor system 100, FIG. 9, includes annular reaction chamber 102. Opening 104, shown in the bottom of chamber 102, serves as the effluent inlet. Opening 106, shown at the top of chamber 102, is the effluent outlet. A plurality of optical fibers 108 are connected at one end to chamber 102 at photonic energy inlets 110. The other end of optical fibers 108 are connected to one or more photonic energy sources (not shown) to provide photonic energy to chamber 102. A plurality of injection nozzles 112 may be provided to allow for the introduction of a reactant to reaction chamber 102. Injection nozzles 112 are typically connected to a common manifold (not shown). Annular reaction chamber 102 may be designed to be readily inserted into the effluent piping system.

Figure 10:
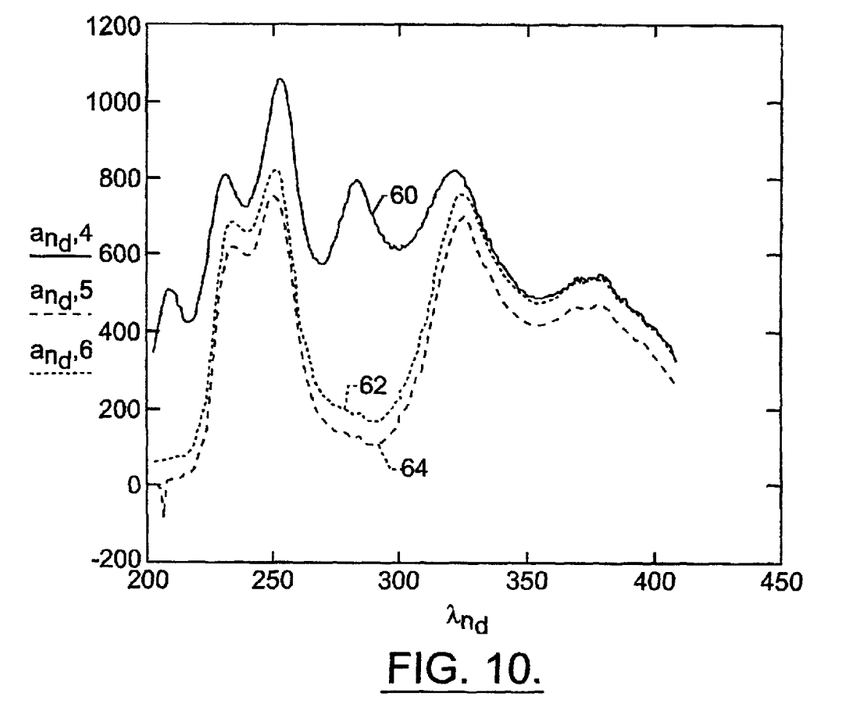
FIG. 10 is a graph of experimental results obtained by reacting sulfur dioxide and oxygen in the presence of Ultraviolet light from a 100W mercury lamp according to the present invention.

Testing of the photonic reactor system of the present invention has occurred using a 100 watt mercury ultraviolet lamp. As shown in FIG. 10, the concentration of sulfur dioxide in the experimental effluent stream is significantly reduced when the ultraviolet lamp is on as shown by line 64 of FIG. 10 when compared to when the ultraviolet lamp is off, line 62. For these two conditions, the sulfur dioxide flow into the test chamber was 5 ml/min and the oxygen flow into the test chamber was 145 ml/min. Line 60 is the baseline with only 145 ml/min oxygen flowing into the test chamber. Subsequent experiments using an excimer laser with a wavelength of 193 nm have shown essentially complete conversion of sulfur dioxide to sulfur trioxide at rates that are too fast to measure with our existing experimental apparatus.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A photocatalytic reactor system for treating flue effluents containing at least one contaminant comprising:
   at least one reactor vessel;
   an effluent inlet connected to the reactor vessel for receiving an effluent stream;
   at least one photonic energy source coupled to the reactor vessel for introducing photonic energy into the effluent stream, said photonic energy source being a laser; and
   an effluent outlet connected to the reactor vessel for discharging a treated effluent stream,
   wherein the photonic energy catalyzes a reaction in the effluent stream to reduce contaminant emissions.

2. The photocatalytic reactor system of claim 1 in which said photonic energy source includes an ultraviolet (UV) energy source.

3. The photocatalytic reactor system of claim 1 further comprising a plurality of reactor vessels connected in parallel with each other to react with a greater flow of the effluent stream.

4. The photocatalytic reactor system of claim 1 further comprising a plurality of reactor vessels connected in series to react with a greater flow of the effluent stream.

5. The photocatalytic reactor system of claim 1 further comprising a plurality of reactor vessels connected in a matrix of series and parallel configurations.

6. The photocatalytic reactor system of claim 1 in which the reactor vessel is cylindrical.

7. The photocatalytic reactor system of claim 1 in which said reactor vessel is spherical.

8. The photocatalytic reactor system of claim 1 in which said reactor vessel is quadrangular.

9. The photocatalytic reactor system of claim 1 in which the contaminant in the effluent stream is sulfur dioxide.

10. The photocatalytic reactor system of claim 9 in which the sulfur dioxide is converted to sulfur trioxide by the photonic energy.

11. The photocatalytic reactor system of claim 1 further comprising a reactant inlet connected to the reactor vessel for injecting at least one reactant into the reactor vessel.

12. The photocatalytic reactor system of claim 11 wherein said reactant is an inert gas.

13. The photocatalytic reactor system of claim 11 wherein said reactant is an inert chemical or chemical mixture.

14. The photocatalytic reactor system of claim 11 wherein said reactant is a reactive gas.

15. The photocatalytic reactor system of claim 11 wherein said reactant is a reactive chemical or chemical mixture.

16. The photocatalytic reactor system of claim 11 wherein said reactant accelerates the conversion of sulfur dioxide to sulfur trioxide.

17. The photocatalytic reactor system of claim 1 further comprising a plurality of photonic energy sources connected to said reactor vessel for increasing the amount of photonic energy introduced into the effluent stream.

18. An ultraviolet catalytic reactor system for treating an effluent stream containing at least one contaminant comprising:
   at least one reactor vessel;
   an effluent inlet connected to the reactor vessel for receiving the effluent stream;
   at least one ultraviolet energy source coupled to the reactor vessel for introducing ultraviolet energy into the effluent stream, said ultraviolet energy source being a laser; and
   an effluent outlet connected to the reactor vessel for discharging a treated effluent stream,
   wherein the ultraviolet energy catalyzes a reaction in the effluent stream to reduce contaminant emissions.

19. The ultraviolet catalytic reactor system of claim 18 further comprising a plurality of reactor vessels connected in parallel with each other to react with a greater flow of the effluent stream.

20. The ultraviolet catalytic reactor system of claim 18 further comprising a plurality of reactor vessels connected in series to react with a greater flow of the effluent stream.

21. The ultraviolet catalytic reactor system of claim 18 further comprising a plurality of reactor vessels connected in a matrix of series and parallel configurations.

22. The ultraviolet catalytic reactor system of claim 18 in which said reactor vessel is cylindrical.

23. The ultraviolet catalytic reactor system of claim 18 in which said reactor vessel is spherical.

24. The ultraviolet catalytic reactor system of claim 18 in which said reactor vessel is quadrangular.

25. The ultraviolet catalytic reactor system of claim 18 in which the contaminant in the effluent stream is sulfur dioxide.

26. The ultraviolet catalytic reactor system of claim 25 which the sulfur dioxide is converted to sulfur trioxide by the ultraviolet energy.

27. The ultraviolet catalytic reactor system of claim 18 further comprising a reactant inlet connected to said reactor vessel for injecting a reactant into the reactor vessel.

28. The ultraviolet catalytic reactor system of claim 27 wherein said reactant is an inert gas.

29. The ultraviolet catalytic reactor system of claim 27 wherein said reactant is an inert chemical or chemical mixture.

30. The ultraviolet catalytic reactor system of claim 27 wherein said reactant is a reactive gas.

31. The ultraviolet catalytic reactor system of claim 27 wherein said reactant is a reactive chemical or chemical mixture.

32. The ultraviolet catalytic reactor system of claim 27 wherein said reactant accelerates the conversion of sulfur dioxide to sulfur trioxide.

33. The ultraviolet catalytic reactor system of claim 18 further comprising a plurality of ultraviolet energy sources connected to said reactor vessel for increasing the amount of ultraviolet energy introduced into the effluent stream.

34. An ultraviolet catalytic reactor system for treating an effluent stream containing at least one contaminant comprising:
   at least one reaction chamber including an annular ring including a first opening for receiving an effluent stream and a second opening for discharging a treated effluent stream;
   a plurality of ultraviolet energy inlets in the annular ring for introducing ultraviolet energy into the effluent stream; and
   at least one ultraviolet energy source connected to the plurality of ultraviolet energy inlets,
   wherein the ultraviolet energy catalyzes a reaction in the effluent stream to reduce contaminant emissions.

35. The ultraviolet catalytic reactor system of claim 34 wherein said at least one ultraviolet energy source is connected to said plurality of ultraviolet energy inlets by a plurality of optical fibers.

36. The ultraviolet catalytic reactor system of claim 34 wherein said annular ring includes a plurality of injection nozzles for injecting a reactant into said reaction chamber.

37. The ultraviolet catalytic reactor system of claim 36 wherein said plurality of injection nozzles is connected to a manifold for delivery of said reactant.

38. The ultraviolet catalytic reactor system of claim 36 wherein said reactant is an inert gas.

39. The ultraviolet reactor system of claim 36 wherein said reactant is an inert chemical or chemical mixture.

40. The ultraviolet catalytic reactor system of claim 36 wherein said reactant is a reactive gas.

41. The ultraviolet catalytic reactor system of claim 36 wherein said reactant is a reactive chemical or chemical mixture.

42. The ultraviolet catalytic reactor system of claim 36 wherein said reactant accelerates the conversion of sulfur dioxide to sulfur trioxide.

43. The ultraviolet catalytic reactor system of claim 34 wherein the contaminant is sulfur dioxide.

44. The ultraviolet catalytic reactor system of claim 34 wherein said ultraviolet energy source is a laser.

45. The ultraviolet catalytic reactor system of claim 34 wherein said ultraviolet energy source is a lamp.

46. A photocatalytic reactor system for treating flue effluents containing at least one contaminant comprising:
   a plurality of reactor vessels connected in parallel with each other;
   an effluent inlet connected to the plurality of reactor vessels for receiving an effluent stream;
   at least one photonic energy source coupled to the plurality of reactor vessels for introducing photonic energy into the effluent stream; and
   an effluent outlet connected to the plurality of reactor vessels for discharging a treated effluent stream,
wherein the photonic energy catalyzes a reaction in the effluent stream to reduce contaminant emissions.

47. A photocatalytic reactor system for treating flue effluents containing at least one contaminant comprising:
   a plurality of reactor vessels connected in a matrix of series and parallel configurations;
   an effluent inlet connected to the plurality of reactor vessels for receiving an effluent stream;
   at least one photonic energy source coupled to the plurality of reactor vessels for introducing photonic energy into the effluent stream; and
   an effluent outlet connected to the plurality of reactor vessels for discharging a treated effluent stream,
wherein the photonic energy catalyzes a reaction in the effluent stream to reduce contaminant emissions.

48. A photocatalytic reactor system for treating flue effluents containing at least one contaminant comprising:
   at least one reactor vessel;
   an effluent inlet connected to the reactor vessel for receiving an effluent stream;
   at least one photonic energy source coupled to the reactor vessel for introducing photonic energy into the effluent stream;
   an effluent outlet connected to the reactor vessel for discharging a treated effluent stream; and
   a reactant inlet connected to the reactor vessel for injecting at least one reactant into the reactor vessel;
wherein the photonic energy catalyzes a reaction in the effluent stream to reduce contaminant emissions.

49. An ultraviolet catalytic reactor system for treating an effluent stream containing at least one contaminant comprising:
   a plurality of reactor vessels connected in parallel with each other;
   an effluent inlet connected to the plurality of reactor vessels for receiving the effluent stream;
   at least one ultraviolet energy source coupled to the plurality of reactor vessels for introducing ultraviolet energy into the effluent stream; and
   an effluent outlet connected to the plurality of reactor vessels for discharging a treated effluent stream,
wherein the ultraviolet energy catalyzes a reaction in the effluent stream to reduce contaminant emissions.

50. An ultraviolet catalytic reactor system for treating an effluent stream containing at least one contaminant comprising:
   a plurality of reactor vessels connected in a matrix of series and parallel configurations;
   an effluent inlet connected to the plurality of reactor vessels for receiving the effluent stream;
   at least one ultraviolet energy source coupled to the plurality of reactor vessels for introducing ultraviolet energy into the effluent stream; and
   an effluent outlet connected to the plurality of reactor vessels for discharging a treated effluent stream,
wherein the ultraviolet energy catalyzes a reaction in the effluent stream to reduce contaminant emissions.

51. An ultraviolet catalytic reactor system for treating an effluent stream containing at least one contaminant comprising:
   at least one reactor vessel;
   an effluent inlet connected to the reactor vessel for receiving the effluent stream;
   at least one ultraviolet energy source coupled to the reactor vessel for introducing ultraviolet energy into the effluent stream;
   an effluent outlet connected to the reactor vessel for discharging a treated effluent stream; and
   a reactant inlet connected to said reactor vessel for injecting a reactant into the
   reactor vessel;
wherein the ultraviolet energy catalyzes a reaction in the effluent stream to reduce contaminant emissions.

* * * * *